June 14, 1927.
C. M. SMITH
1,632,631
VALVE GUIDE FOR FLUSHING TANKS
Filed May 12, 1926
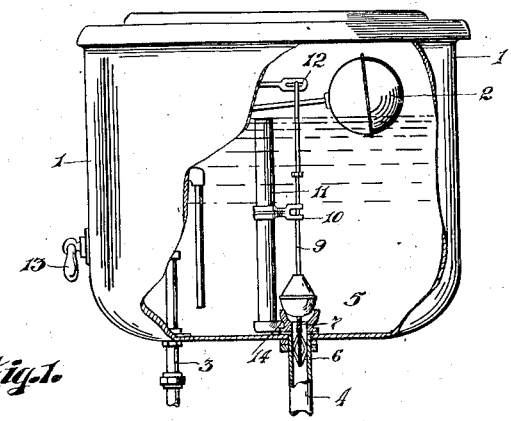
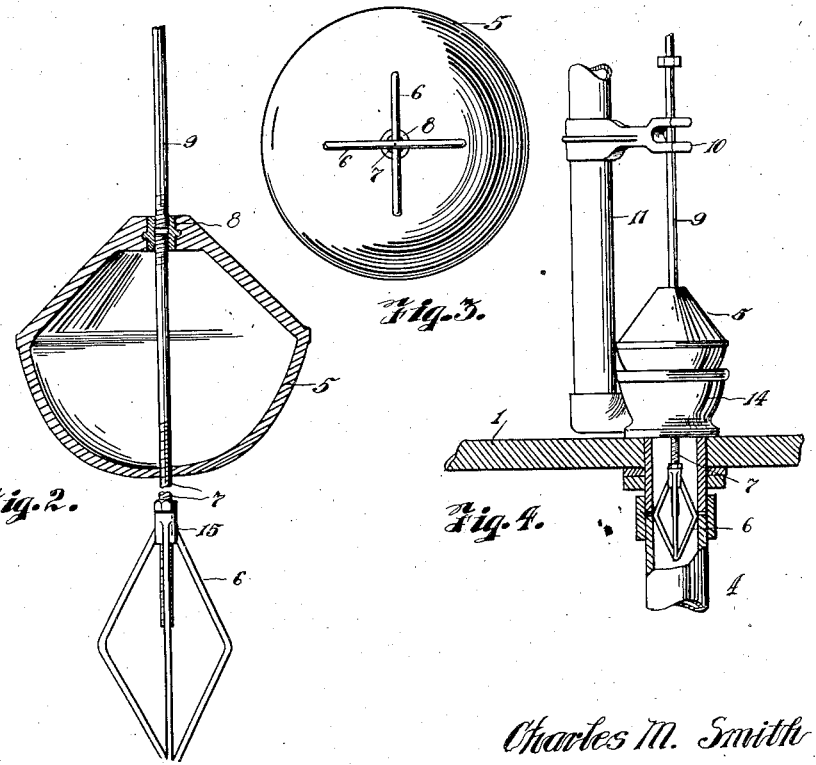
Charles M. Smith
INVENTOR.
BY  J C Waldrop
ATTORNEYS.

Patented June 14, 1927.

1,632,631

UNITED STATES PATENT OFFICE.

CHARLES M. SMITH, OF WACO, TEXAS, ASSIGNOR OF FIFTY-ONE PER CENT TO FRANCIS M. COMPTON, OF WACO, TEXAS.

VALVE GUIDE FOR FLUSHING TANKS.

Application filed May 12, 1926. Serial No. 108,529.

This invention relates to flush and water service tanks, and it is particularly directed toward the improvement of the discharge valve of such tanks, the principal object being to increase the efficiency thereof as well as to materially reduce the effects of constant frictional wear upon the valve stem resulting from improper seating of the valve upon its seat.

The invention further proposes, as a further advantage derived through the particular structure thereof, to obviate the annoyance and consequent waste of water continuously running past a defective valve, especially in the character of flushing tank adapted for private residences.

With the proposed and further objects in view, the invention has particular reference to its salient features of construction and peculiar arrangement of parts hereinafter referred to and illustrated in the accompanying drawings, wherein:

Figure 1 represents an elevational view of the usual commode flush tank with portions cut away to illustrate the position of the invention installed therein.

Figure 2 is a vertical cross-sectional view of the usual flexible ball valve equipped with the invention.

Figure 3 is a lower end view of Figure 2, and

Figure 4 is a fragmentary detail view partly in section, further depicting the installed position of the invention.

Referring now more particularly to the figure in the drawing, the usual flush tank 1 is illustrated, having a float 2, inlet valve 3, discharge pipe 4, and other operating elements, none of which are claimed herein as new, nor required to be altered in any respect to effect proper installation of the invention, which will presently disclose itself.

It is of course a well known precedent to employ buoyant valves of the type shown for flush tanks but since the constant vertical movement to which the valve and its stem is subjected, tends to greatly wear upon its supports, these elements sometimes become prematurely defective as a result of such wear, and are consequently ineffective for preventing release of water from the tank due to improper seating of the valve.

Combined with the ball valve 5, constructed of rubber or an equivalent material, the invention consists of an angular skeleton frame 6, having an integral, upwardly extending stem 7 which latter member is extended through the ball 5 and is threaded into an interiorly threaded plug 8, embedded in the top of said ball.

The valve stem 9, is likewise threaded into the plug 8, and continues upward, through a support 10 secured to the pipe 11, and to its upper end is attached a lever 12, as in Figure 1, having connection with the flushing lever 13, accessible exteriorly of the tank.

A seat 14 for the ball 5 is provided at the mouth of the discharge pipe, which has a concave interior, so as to properly receive the lower portion of the ball, as shown in Figure 1 especially.

It is sometimes necessary in order to cope with circumstances requiring alteration of equipment, or installation of elements within the tank, to allow for the adjustment of the frame 6 upon the rod 7. Such adjustment is attained by threading the lower end of the rod 7, and providing a nut 15 to which the wires forming the cage of the frame 6 are attached, which is threaded upon the rod 7 as shown. A lock nut 16 is adapted to bear against the latter nut to hold the cage against displacement.

It is very obvious that when the lever 13 is pressed and the valve 5 raised to discharge the water from the tank in flushing, the ball 5 is forced to rise in a perpendicular manner above its seat and is not permitted by the invention to deviate from such a position during its descent upon seat 7, and consequently a proper seating is established by which is brought about a saving in water, combined with an obvious economy in maintenance of equipment.

From the foregoing, it will be seen that there are a series of wires 6 connected at their upper ends to the nut and connected at their lower ends together and having intermediate angular portions which latter provide a multiplicity of guides which engage throughout the inner circumference of the discharge pipe.

While other valves and valve guides are known to be in existence and patented, the present invention is not intended to include any of the features of such valves and guides, but is proposed as an improvement over such valves and guides in affording as it does a smooth sliding frame, such smooth action being attained by the deflecting angles of said frame barely impinging the interior walls of the discharge pipe, and further, a means to effect vertical adjustment of this frame.

With the foregoing in view, what is claimed and desired to secure by Letters Patent is:

In combination with the discharge pipe and the valve and valve seat of a flushing tank, a plug in the valve having upper and lower threaded portions, an upper guide rod threaded into engagement with the upper threaded portion of the plug, a lower guide rod having upper and lower threaded ends, the upper of which ends is threaded into the lower threaded portion of the plug, a nut adjustably threaded onto the lower threaded end of the lower guide rod, a cage composed of a series of wires secured to the nut at their upper ends and having intermediate angular parts, the wires being secured together at their lower ends, the angles of the wires forming a series of guides which engage the discharge pipe throughout its inner circumference and a lock nut on the threaded part of the lower guide rod for holding the first named nut in its adjusted position.

In testimony whereof I affix my signature.

CHARLES M. SMITH.